(12) United States Patent
Yamashita

(10) Patent No.: US 7,860,372 B2
(45) Date of Patent: Dec. 28, 2010

(54) TELEVISION RECEIVER INTEGRATED WITH RECORDING AND REPRODUCING DEVICE

(75) Inventor: Hiroshi Yamashita, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1071 days.

(21) Appl. No.: 11/270,809

(22) Filed: Nov. 9, 2005

(65) Prior Publication Data

US 2006/0119735 A1    Jun. 8, 2006

(30) Foreign Application Priority Data

Nov. 9, 2004 (JP) ............................ P2004-324922

(51) Int. Cl.
- H04N 7/64 (2006.01)
- H04N 5/94 (2006.01)
- H04N 5/91 (2006.01)
- H04N 7/01 (2006.01)

(52) U.S. Cl. ............................ 386/113; 386/47; 386/51; 386/83; 386/131

(58) Field of Classification Search ............... 386/46, 386/83, 109, 125, 126, 131, 47, 51, 113; 348/705
See application file for complete search history.

(56) References Cited

U.S. PATENT DOCUMENTS

| | | | | |
|---|---|---|---|---|
| 5,412,478 | A * | 5/1995 | Ishihara et al. | 348/72 |
| 5,438,375 | A * | 8/1995 | Sasabe et al. | 348/706 |
| 5,589,992 | A * | 12/1996 | Shibata et al. | 386/72 |
| 5,982,449 | A * | 11/1999 | Nagai et al. | 348/553 |
| 6,240,245 | B1 * | 5/2001 | Kato et al. | 386/131 |
| 6,483,550 | B1 * | 11/2002 | Murata et al. | 348/572 |
| 2001/0017972 | A1 * | 8/2001 | Dumont et al. | 386/46 |
| 2002/0037160 | A1 * | 3/2002 | Locket et al. | 386/111 |
| 2002/0113893 | A1 * | 8/2002 | Tsui | 348/554 |
| 2004/0133921 | A1 * | 7/2004 | Kakiuchi et al. | 725/131 |
| 2005/0134744 | A1 * | 6/2005 | Shan et al. | 348/670 |

FOREIGN PATENT DOCUMENTS

| | | |
|---|---|---|
| EP | 0847207 A2 * | 5/1995 |
| JP | 3000696 | 6/1994 |
| JP | 09-163305 | 6/1997 |
| JP | 11-004390 | 1/1999 |

OTHER PUBLICATIONS

Patent Abstracts of Japan, Publication No. 09-163305 dated Jun. 20, 1997 (2 pages).
Patent Abstracts of Japan, Publication No. 11-004390 dated Jan. 6, 1999 (2 pages).

* cited by examiner

*Primary Examiner*—Thai Tran
*Assistant Examiner*—Hung Q Dang
(74) *Attorney, Agent, or Firm*—Osha Liang LLP

(57) ABSTRACT

A television receiver includes: a video decoder that converts a composite signal into a digital signal; a video encoder that converts a reproduced data or the digital signal to output a Y/C signal; a monitor; a detecting unit that detects the reception of broadcast signal; and a controller. When the detecting unit detects that the receiving state is good, the controller controls the video encoder to convert the digital signal so that broadcast pictures are displayed on the monitor by using the Y/C signal. When the detecting unit detects that the receiving state is not good, the broadcast pictures are displayed on the monitor by using the composite signal. When the recording medium is reproduced, the controller controls the video encoder to convert the reproduced data so that reproduced pictures are displayed on the monitor by using the Y/C signal or the component signal.

9 Claims, 3 Drawing Sheets

TELEVISION RECEIVER INTEGRATED WITH RECORDING AND REPRODUCING DEVICE

BACKGROUND OF THE INVENTION

1. Field of the Invention

The present invention relates to a television receiver integrated with a recording and reproducing device.

2. Background Art

As described in Patent Document 1, a television receiver integrated with a DVD recorder according to the related art converts video data recorded on a DVD into an analog video signal, displays reproduced pictures of the DVD on a monitor by using the video signal, and further displays broadcast pictures on a monitor by using a composite signal to be output by a broadcast receiver. In Patent Document 2, a television receiver integrated with a DVD player is described, including a function of preventing burn-in on a monitor screen, which should be handled when still picture reproduction video of DVD or on-screen display is continuously displayed on the monitor. In Patent Document 3, the construction of a television receiver integrated with a videotape recorder is described.

[Patent Document 1] JP-A-9-163305 (paragraphs [0001] to [0008] and FIG. 6)

[Patent Document 2] JP-A-11-4390 (Abstract and paragraphs [0041] to [0045])

[Patent Document 3] Japanese Registered Utility Model No. 3000696 (Abstract)

SUMMARY OF THE INVENTION

In the meantime, in order to display clear broadcast pictures on a monitor, the broadcast pictures are not displayed by using a composite signal to be output from a broadcast receiver, but the broadcast pictures are preferably displayed by using a Y/C signal (which is an analog signal separated into a Y signal (luminance signal) and C signal (chrominance signal)) which is converted by digitizing a composite signal by a circuit for recording and reproducing a broadcast signal. In this case, however, when a receiving state of the broadcast signal is bad and a signal level of the composite signal is low, the composite signal cannot be converted into the Y/C signal due to the limited capacity of the circuit for recording and reproducing. Therefore, in that case, there occurs a problem in that the Y/C signal becomes in an idle state and thus the broadcast pictures are not displayed on a monitor.

The present invention has been finalized in view of the drawbacks, and an object of the present invention is that it provides a television receiver integrated with a recording and reproducing device, which is capable of displaying clear broadcast pictures on a monitor and further displaying broadcast picture without being affected by a converting circuit of a video signal.

According to an aspect of the present invention, a television receiver integrated with recording and reproducing device includes a video decoder that converts a composite signal output from a broadcast signal receiver into a digital signal to output the digital signal; a recording and reproducing unit that records the digital signal onto a DVD and reproduces data recorded on the DVD; a video encoder that converts the reproduced data or the digital signal into a Y/C signal to output the Y/C signal; a monitor that displays pictures; a detecting unit that detects a receiving state of a broadcast signal; and a controller that controls individual units of the television receiver. When the detecting unit detects that the receiving state is good, the controller controls the video encoder to convert the digital signal so that broadcast pictures are displayed on the monitor by using the Y/C signal or a component signal. When the detecting unit detects that the receiving state is not good, the broadcast pictures are displayed on the monitor by using the composite signal. When the recording medium is reproduced, the controller controls the video encoder to convert the reproduced data, so that the reproduced picture is displayed on the monitor by using the Y/C signal or the component signal. Here, the controller corresponds to a CPU 21 or 41 described in an embodiment of the invention. The recording and reproducing unit corresponds to a recording and reproducing unit 26, an MPEG2 encoder 27, and an MPEG2 decoder 29 described in the embodiment. In addition, the detecting unit corresponds to a video decoder 28 described in the embodiment, which has a function of detecting whether the receiving state of a broadcast signal is good or not.

As described above, when the receiving state of broadcast signal is good, the broadcast pictures are displayed on the monitor by using the Y/C signal or the component signal. Therefore, without any problems occurring when the broadcast pictures are displayed by a composite signal (for example, dot disturbance caused by a color signal which still remains in a luminance signal or cross-color caused when a color signal and a luminance signal are mixed with each other), clear television broadcast pictures can be displayed on the monitor. Furthermore, since the encoder used for producing the Y/C signal or the component signal is originally a device which records and reproduces a broadcast signal, the cost for an additional device is not needed. In the meantime, when the receiving state of broadcast signal is not good, the broadcast pictures are displayed on the monitor by the composite signal to be output from the receiver. Therefore, even when the Y/C signal or the component signal cannot be produced from the composite signal by the video decoder and the video encoder, a user can watch broadcast picture corresponding to the receiving state of the broadcast signal.

In the embodiment of the present invention, the recording medium is a DVD, and broadcast pictures and reproduced pictures are displayed by using the Y/C signal between the Y/C signal and component signal. Therefore, a circuit for producing the component signal is not needed, and thus the cost of the device can be reduced.

According to another aspect of the invention, the television receiver integrated with a recording and reproducing device further includes a storage unit that stores defined values defining a display mode when the detecting unit detects that the receiving state is not good. When the defined value is a first value, the controller displays the broadcast pictures on the monitor by using the composite signal. When the defined value is a second value, the controller displays the broadcast pictures on the monitor by using the Y/C signal or the component signal. Accordingly, a display mode according to user's preference can be provided.

According to the present invention, when the receiving state of the broadcast signal is good, the broadcast pictures are displayed by using the Y/C signal or the component signal. When the receiving state of broadcast signal is not good, the broadcast pictures are displayed by the composite signal. Therefore, clear broadcast pictures can be displayed on a monitor, and further the broadcast pictures can be displayed without being affected by the converting circuit of broadcast signal.

BRIEF DESCRIPTION OF THE DRAWINGS

The present invention may be more readily described with reference to the accompanying drawings.

DETAILED DESCRIPTION OF THE PREFERRED EMBODIMENTS

Figure 1:
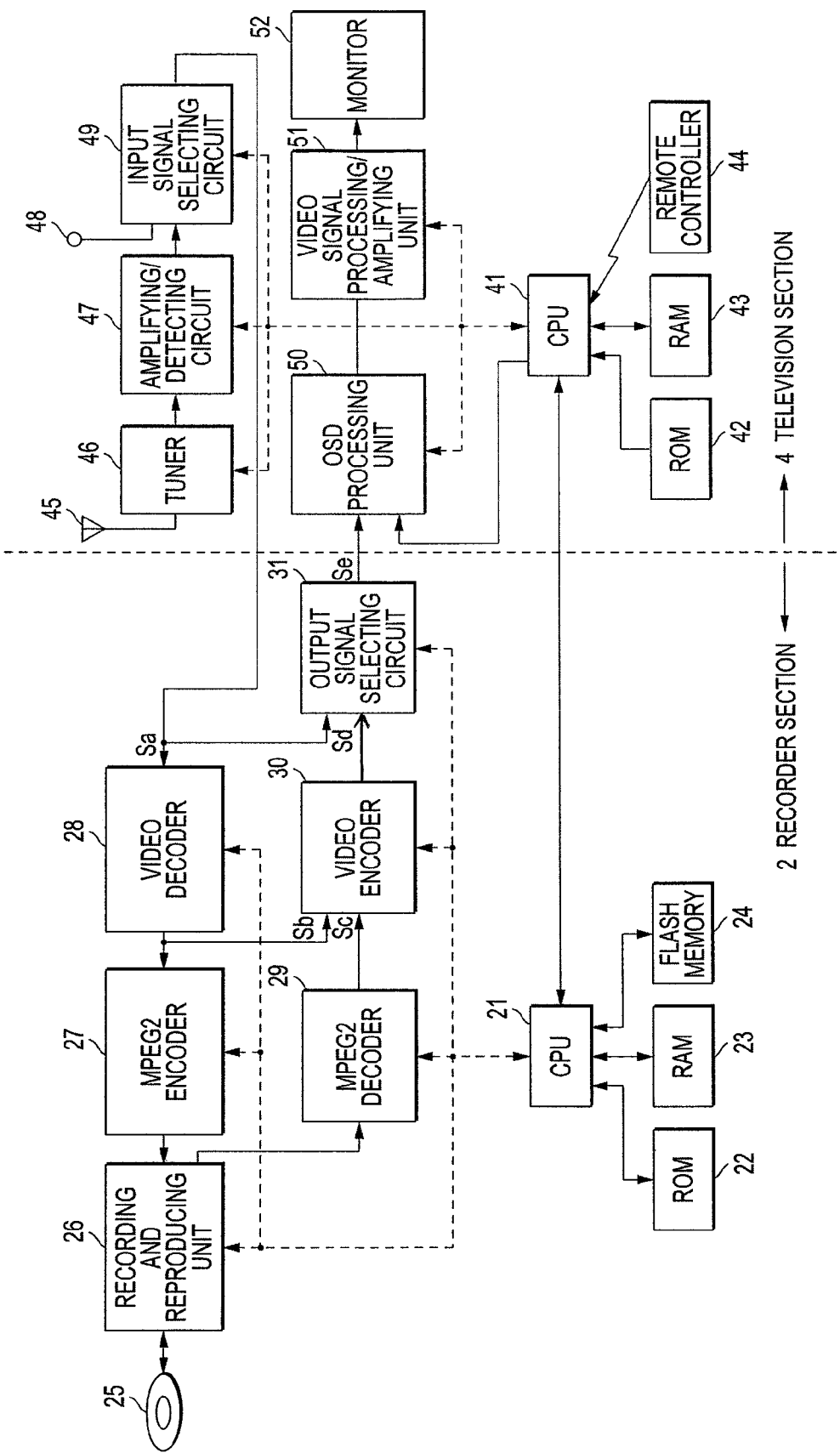
FIG. 1 is a block diagram showing a Television receiver integrated with a DVD recorder.

FIG. 1 is a block diagram showing a television receiver integrated with a DVD recorder (hereinafter, referred to as an apparatus) which is an example of a television receiver integrated with a recording and reproducing apparatus according to the present invention. The apparatus is configured by a DVD recorder section 2 (hereinafter, referred to as a recorder section 2) and a television receiver section 4 (hereinafter, referred to as a television section 4). In FIG. 1, broken lines terminating in arrow heads indicate flows of control signals. Moreover, since a process for television broadcast audio signal is not directly related to the invention, a diagrammatic representation and description thereof will be omitted.

The recorder section 2 includes a CPU 21, a ROM, a RAM 23, and a flash memory 24. The CPU 21 executes a program stored in the ROM 22 so as to control operations of individual units of the recorder section 2. In addition, the CPU 21 transmits and receives commands and data to and from a CPU 41 of the television section 4. The RAM 23 is used as a storage area in which various control data are stored and as an operating area for the CPU 21. In the flash memory 24, setup data for individual units of the recorder section 2, such as a video encoder 30 or the like, is stored. After a power supply is applied, the CPU 21 reads the setup data to set into individual units, so that the units perform desired operations.

The television section 4 also includes a CPU 41, a ROM 42 and a RAM 43. The CPU 41 executes a program stored in the ROM 42 so as to control an operation of individual units of the television section 4. The RAM 43 is used as a storage area, in which various control data and the like are stored, and as an operating area for the CPU 41. A remote controller 44 of the television section 4 is provided with a power switch, operation keys for recorder section 2 such as a play key and the like, and operation keys for television section 4 such as a channel selection key and the like. If an operation keys for television section 4 is pressed, the CPU 41 performs the process according to the pressed operation key. On the contrary, if an operation key for recorder section 2 is pressed, the CPU 41 transmits information concerning the operation key to the CPU 21 of the recorder section 2. The CPU 21 of the recorder section 2 receiving the information performs the process corresponding to the pressed operation key.

Next, a video signal will be described. A broadcast signal received by an antenna 45 is selected by a tuner 46 to be input into an amplifying/detecting circuit 47. The amplifying/detecting circuit 47 amplifies the input signal and then detects it so as to output a composite signal which is an analog broadcast video signal. In accordance with the setup data to be set by the CPU 41, an input signal selecting circuit 49 selects and outputs an output signal of the amplifying/detecting circuit 47 or a signal input from an external input terminal 48 (for example, a composite signal output when a video tape recorder connected to the external input terminal 48 reproduces a video tape) to output it. Since the output signal is also a composite signal, the corresponding signal is referred to as a composite signal Sa. The composite signal Sa is input into a video decoder 28 and an output signal selecting circuit 31. In the following descriptions, it is assumed that the input signal selecting circuit 49 is set so as to select an output signal of the amplifying/detecting circuit 47.

The video decoder 28 separates the composite signal Sa into one luminance signal and two color-difference signals, and then digitizes the signals so as to output a digital signal (a digital broadcast video signal) Sb. The video decoder 28 has a function of detecting whether the composite signal Sa is good or not, that is, whether a receiving state of broadcast signal is good or not, based on a signal level from the composite signal Sa. For example, if a signal level of the composite signal Sa is higher than a predetermined value, the receiving state is good. On the contrary, if a signal level of the composite signal Sa is lower than a threshold value, the receiving state is bad. The detection information is acquired by the CPU 21. Moreover, as described below, a video display signal of a monitor is changed by the detection signal. Therefore, when the receiving state of the composite signal Sa changes, the detection information is preferably updated only when a state after the change continues for a predetermined time (for example, one second).

The above-described digital broadcast video signal Sb is encoded in MPEG2 format by an MPEG2 encoder 27. Further, the encoded broadcast video signal is recorded in a recordable DVD 25 (DVD-R or DVD-RW, etc.) by a recording and reproducing unit 26. The recording and reproducing unit 26 includes an optical pickup for writing and reading data into and from the DVD 25, a modulating circuit for modulating the encoded broadcast video signal into a write signal of the DVD 25, a demodulating circuit for demodulating a signal read from the DVD 25, a tray which carries the DVD 25 mounted thereon into the apparatus, and a rotary driving mechanism for rotating the DVD 25.

Data of the DVD 25 reproduced by the recording and reproducing unit 26 is decoded by the MPEG decoder 29. The decoded signal, i.e. a reproduced picture video signal Sc is input into the video encoder 30. The above-described digital broadcast video signal Sb is also input into the video encoder 30. In accordance with the setup data which is set by the CPU 21, the video encoder 30 encodes the reproduced video signal Sc or the digital broadcast video signal Sb into a Y/C signal Sd to output it. The Y/C signal Sd is an analog video signal composed of a Y signal (luminance signal) and a C signal (chroma signal). In accordance with the setup data which is set by the CPU 21, the output signal selecting circuit 31 selects the Y/C signal Sd or the composite signal Sa and output it. The output signal is referred to as a video display signal Se.

An OSD processing unit 50 overlaps an on-screen display signal sent from the CPU 41 and the video display signal Se, and then outputs it. The on-screen display signal is a signal that is produced and sent by the CPU 41 when on-screen display (for example, display such as a number or sound volume of current broadcast channel) is performed. A video signal processing/amplifying unit 51 extracts a vertical synchronizing signal, a horizontal synchronizing signal, and R, G, B signals from the output signal of the OSD processing unit 50 and then amplifies the extracted signals to output. The monitor 52 is driven on the basis of the amplified signals, so that real-time broadcast pictures, reproduced pictures of the DVD 25, and the on-screen display are displayed on the monitor 52.

Figure 2:
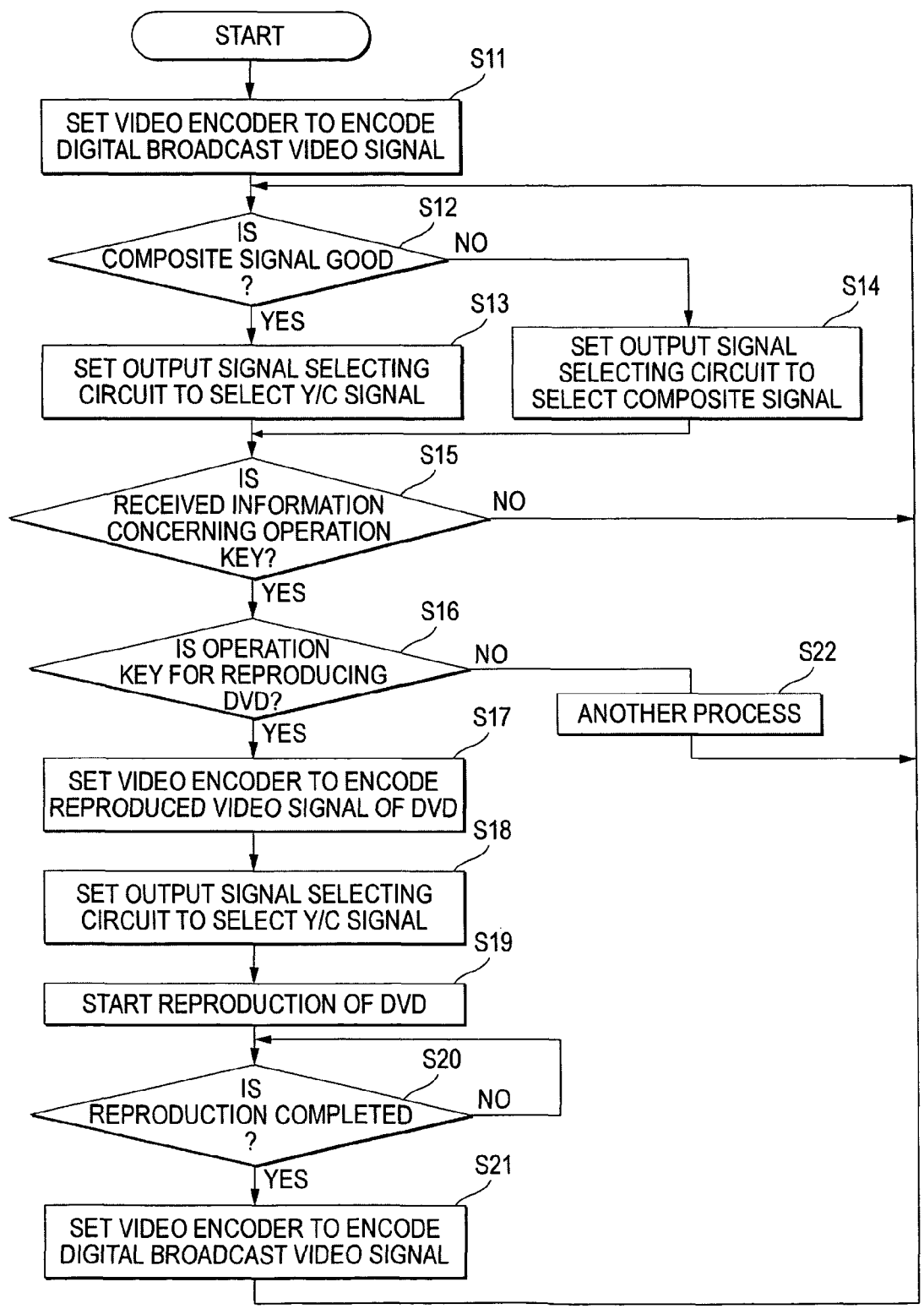
FIG. 2 is a flow chart showing an operation of a recorder section.
Figure 3:
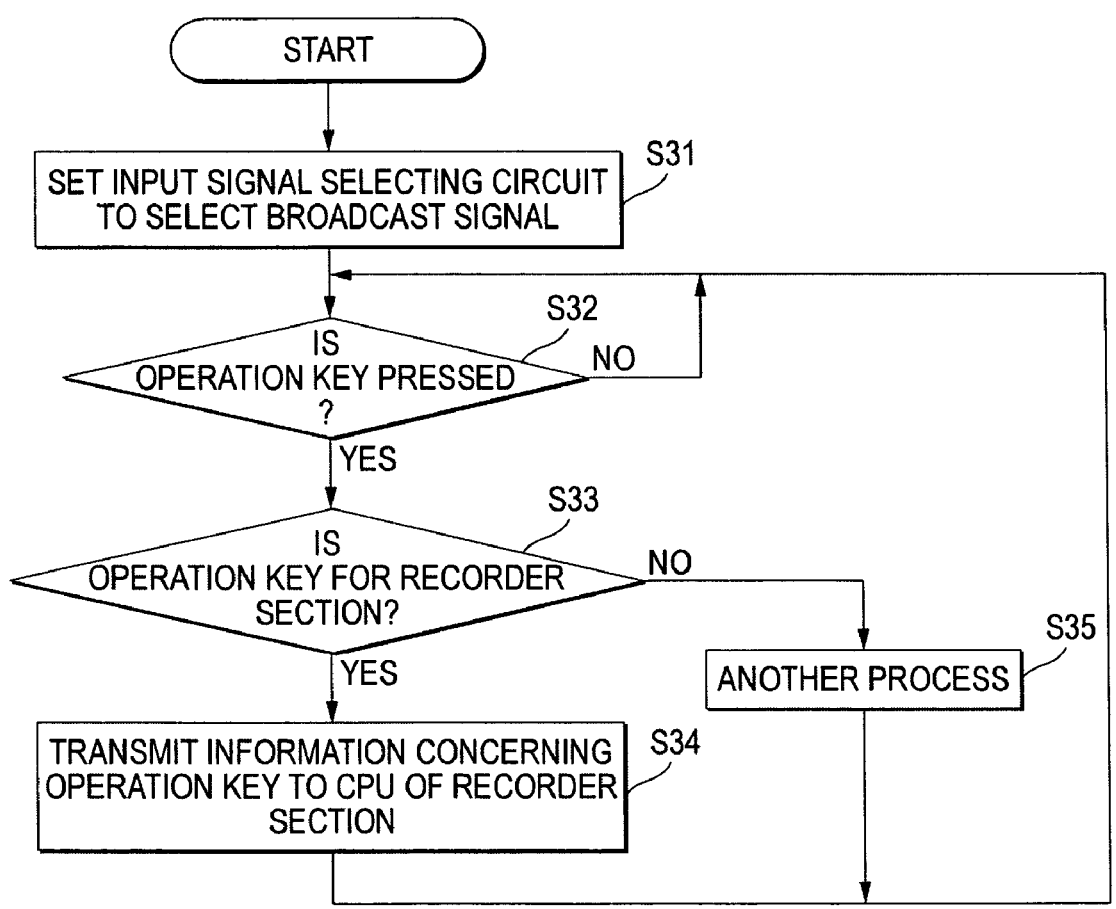
FIG. 3 is a flowchart showing an operation of a television section.

Next, an operation of the apparatus will be described. FIG. 2 is a flow chart showing an operation of the recorder section 2, and FIG. 3 is a flow chart showing an operation of the television section 4. First, an operation of the recorder section 2 will be described with reference to FIG. 2. If a power supply is applied, the CPU 21 performs an initialization process of individual units of the recorder section 2 (such as a process of reading data stored in the flash memory 24 to set the data in the video encoder 30, a process of moving the optical pickup of the recording and reproducing unit 26 to a reference position, or the like). Then, the video encoder 30 is set so as to encode the digital broadcast video signal Sb into the Y/C signal Sd (S11).

Next, the CPU 21 acquires from the video decoder 28 detection information indicating whether the composite signal Sa is good or not, and then determines whether the composite signal Sa is good or not (S12). If the composite signal Sa is good (S12: YES), the CPU 21 sets the output signal selecting circuit 31 to select the Y/C signal Sd (S13). If the composite signal Sa is not good (bad) (S12: NO), the CPU 21 sets the output signal selecting circuit 31 to select the composite signal Sa (S14). Next, the CPU 21 determines whether information concerning the operation key is received from the CPU 41 of the television section 4 (S15) When the information concerning the operation key is not received (S15: NO), the CPU 21 again determines whether the composite signal Sa is good or not (S12). When the information concerning the operation key is received (S15: YES), the CPU 21 determines whether the corresponding operation key is an operation key for reproducing the DVD 25 or not (S16).

When the operation key is an operation key for reproducing the DVD 25 (S16: YES), the CPU 21 sets the video encoder 30 to encode the reproduced video signal Sc of the DVD 25 into the Y/C signal Sd (S17), and further sets the output signal selecting circuit 31 to select the Y/C signal Sd (S18). Then, the rotary driving mechanism of the recording and reproducing unit 26 is operated to start the reproduction of DVD 25 (S19). After that, if the reproduction of DVD 25 is completed (S20: YES), the CPU 21 sets the video encoder 30 to encode the digital broadcast video signal Sb into the Y/C signal Sd, so that real-time broadcast pictures are displayed on the monitor 52 (S21). Then, the CPU 21 again determines whether the composite signal Sa is good or not (S12). When the received information concerning the operation key is not on an operation key for reproducing the DVD 25 (S16: NO), the CPU 21 performs another processes (for example, a process of recording broadcast video signals on the DVD 25 when the corresponding operation key is the recording key) (S22). Then, the CPU 21 again determines whether the composite signal Sa is good or not (S12).

To summarize the above descriptions, if the composite signal Sa is good when the DVD 25 is not reproduced, the broadcast pictures are displayed on the monitor 52 by the Y/C signal Sd, so that the broadcast pictures are displayed clearly. On the contrary, if the composite signal Sa is not good, the broadcast pictures are displayed on the monitor 52 by the composite signal Sa. In other words, even when the Y/C signal Sd cannot be produced from the composite signal Sa, the broadcast pictures are not set in a non-display state, but the broadcast picture corresponding to the receiving state of broadcast signal is displayed. In the meantime, during reproducing the DVD 25, the reproduced video of DVD 25 is displayed on the monitor 52 by the Y/C signal Sd encoded from the reproduced video signal Sc.

Moreover, although not shown in FIG. 2, a message indicating that the receiving state is not good may be on-screen displayed on the monitor 52, in order to inform a user that the composite signal Sa is not good, that is, that the receiving state of the broadcast signal is not good. In the above-described description, when the composite signal Sa is not good, the composite signal Sa is always selected by the output signal selecting circuit 31. Instead of them, data defining a display mode when the composite signal Sa is not good is set in the flash memory 24, and the composite signal or the Y/C signal Sd may be selected by the output signal selecting circuit 31 according to a value of the data (for example, '0' or '1' which are a first or a second value). In this case, a predetermined operation is performed by an operation key of the remote controller 44 so that the above setup data can be updated.

Next, an operation of the television section 4 will be described with reference to FIG. 3. If a power supply is applied, the CPU 41 sets the input signal selecting circuit 49 to select a broadcast signal (an output signal of the amplifying/detecting circuit 47) (S31). Moreover, when an operation of displaying video of a signal input from the external input terminal 48 on a monitor or an operation of recording the signal on the DVD 25 is performed by the operation key of the remote controller 44, the CPU 41 sets the input signal selecting circuit 49 to select the signal input from the external input terminal 48.

Then, the CPU 41 waits for an operation key of the remote controller 44 to be pressed (S32). If an operation key is pressed (S32: YES), the CPU 41 determines whether the operation key is an operation key for recorder section 2 or not (S33). When the operation key is an operation key for recorder section 2 (S33: YES), the CPU 41 transmits information concerning the operation key to the CPU 21 of the recorder section 2 (S34), and again waits for an operation key to be pressed (S32). When the operation key is not an operation key for recorder section 2 (S33: NO), that is, when the operation key is an operation key for television section 4, the CPU 41 performs another processes (for example, a process of setting the selected broadcast channel to the tuner 46 when the channel selection key is pressed) (S35), and again waits for an operation key to be pressed (S32).

In the above described embodiment, the digital broadcast video signal Sb to be output by the video decoder 28 is encoded by the video encoder 30, thereby producing the Y/C signal Sd. Instead of them, the present invention can be also embodied by the following method. A signal to be output by the MPEG2 encoder 27 is input into the MPEG2 decoder, thereby obtaining the Y/C signal Sd. In this case, the video decoder 28 and MPEG2 encoder 27 correspond to the video decoder of the invention, and the video encoder 30 and MPEG2 decoder 29 correspond to the video encoder of the invention.

In the above described embodiment, pictures are displayed on the monitor 52 by the using Y/C signal Sd. Instead of them, a video encoder producing an analog composite signal composed of one luminance signal and two color-difference signals CR and CB may be adopted, so that video is displayed on the monitor 52 by the composite signal. Further, in the above described embodiment, the video decoder 28 also functions as a detecting unit that detects whether the composite Sa is good or not, that is, whether the receiving state of broadcast signal is good or not, on the basis of a signal level of the composite signal Sa. However, a dedicated detecting unit may be provided separately. In addition, it may be detected whether the receiving state of broadcast signal is good or not by using another method.

In the above-described embodiment, a recording medium is the DVD 25. However, a recording medium may be, for example, an optical disc such as CD-RW or a hard disc other than the DVD 25. Further, in the above-described embodiment, a single tuner 46 is used. However, the present invention can be embodied for a case that an additional tuner is provided for the recorder section 2 so as to record a program on a different channel. Further, in the above-described embodiment, the case has been described where the recorder section 2 is controlled by the CPU 21 and the television section 4 is controlled by the CPU 41. However, the record section 2 and television section 4 may be controlled by only one CPU.

What is claimed is:

1. A television receiver comprising:
  a tuner configured to receive a broadcast signal and to output a composite signal;
  a video decoder configured to convert the composite signal into a digital signal;
  a reproducer configured to reproduce data recorded on a DVD;
  a video encoder configured to convert each of the data and the digital signal into a Y/C signal;
  a detector configured to detect whether a signal level of the composite signal becomes lower than a threshold value while the broadcast signal is received by the tuner;
  a selector configured to selectively output either the composite signal or the Y/C signal;
  a monitor configured to display pictures based on one of the composite signal and the Y/C signal output from the selector; and
  a controller configured to cause the selector to output the Y/C signal when the detector detects that the signal level becomes no lower than the threshold value while the broadcast signal is received by the tuner, and to cause the selector to output the composite signal when the detector detects that the signal level becomes lower than the threshold value while the broadcast signal is received by, the tuner,
  wherein the threshold value is independent of whether or not the video encoder is able to convert the data into the Y/C signal.

2. The television receiver according to claim 1, further comprising:
  a storage unit storing a first value and a second value which are selectable by a user; wherein:
  when the first value is selected, the controller causes the selector to output the composite signal when the detector detects that the signal level becomes lower than the threshold value while the broadcast signal is received by the tuner; and
  when the second value is selected, the controller causes the selector to output the Y/C signal even when the detector detects that the signal level becomes lower than the threshold value while the broadcast signal is received by the tuner.

3. The television receiver according to claim 1, wherein:
  the detector detects that the signal level becomes lower than the threshold value when the signal level of the composite signal which is lower than the threshold value is maintained for a predetermined time period; and
  the detector detects that the signal level becomes no lower than the threshold value when the signal level of the composite signal which is not lower than the threshold value is maintained for a predetermined time period.

4. A television receiver comprising:
  a tuner configured to receive a broadcast signal and to output a composite signal;
  a video decoder configured to convert the composite signal into a digital signal;
  a reproducer configured to reproduce data recorded on a recording medium;
  a video encoder configured to convert each of the data and the digital signal into a component signal;
  a detector configured to detect whether a signal level of the composite signal becomes lower than a threshold value while the broadcast signal is received by the tuner;
  a selector configured to selectively output either the composite signal or the component signal;
  a monitor configured to display pictures based on one of the composite signal and the component signal output from the selector; and
  a controller configured to cause the selector to output the component signal when the detector detects that the signal level becomes no lower than the threshold value while the broadcast signal is received by the tuner, and to cause the selector to output the composite signal when the detector detects that the signal level becomes lower than the threshold value while the broadcast signal is received by the tuner,
  wherein the threshold value is independent of whether or not the video encoder is able to convert the data into the component signal.

5. The television receiver according to claim 4, further comprising:
  a storage storing a first value and a second value which are selectable by a user, wherein:
  when the first value is selected, the controller causes the selector to output the composite signal when the detector detects that the signal level becomes lower than the threshold value while the broadcast signal is received by the tuner; and
  when the second value is selected, the controller causes the selector to output the component signal even when the detector detects that the signal level becomes lower than the threshold value while the broadcast signal is received by the tuner.

6. The television receiver according to claim 4, wherein:
  the detector detects that the signal level becomes lower than the threshold value when the signal level of the composite signal which is lower than the threshold value is maintained for a predetermined time period; and
  the detector detects that the signal level becomes no lower than the threshold value when the signal level of the composite signal which is not lower than the threshold value is maintained for a predetermined time period.

7. A television receiver comprising:
  a tuner configured to receive a broadcast signal and to output a composite signal;
  a video decoder configured to convert the composite signal into a digital signal;
  a video encoder configured to convert the digital signal into a component signal;
  a detector configured to detect whether a signal level of the composite signal becomes lower than a threshold value while the broadcast signal is received by the tuner;
  a selector configured to selectively output either the composite signal or the component signal;
  a monitor configured to display pictures based on one of the composite signal and the component signal output from the selector; and a controller configured to cause the selector to output the component signal when the detector detects that the signal level becomes no lower than the threshold value while the broadcast signal is received by the tuner, and to cause the selector to output the composite signal when the detector detects that the signal level becomes lower than the threshold level while the broadcast signal is received by the tuner, wherein the threshold value is independent of whether or not the video encoder is able to convert the data into the component signal.

8. The television receiver according to claim 7, further comprising:

a storage storing a first value and a second value which are selectable by a user, wherein:

when the first value is selected, the controller causes the selector to output composite signal when the detector detects that the signal becomes lower than the threshold value while the broadcast signal is received by the tuner; and when the second value is selected, the controller causes the selector to output the component signal even when the detector detects that the signal level becomes lower than the threshold value while the broadcast signal is received by the tuner.

9. The television receiver according to claim 7, wherein:

the detector detects that the signal level becomes lower than the threshold value when the signal level of the composite signal which is lower than the threshold value is maintained for a predetermined time period; and the detector detects that the signal level becomes no lower than the threshold value when the signal level of the composite signal which is not lower than the threshold value is maintained for a predetermined time period.

* * * * *